Dec. 31, 1940.  O. F. QUARTULLO  2,227,379
ENGINE MOUNTING
Filed March 3, 1939  3 Sheets-Sheet 1

INVENTOR:
ORPHEUS F. QUARTULLO
BY
ATTORNEY

INVENTOR:
ORPHEUS F. QUARTULLO
BY
ATTORNEY

Dec. 31, 1940.   O. F. QUARTULLO   2,227,379
ENGINE MOUNTING
Filed March 3, 1939   3 Sheets-Sheet 3
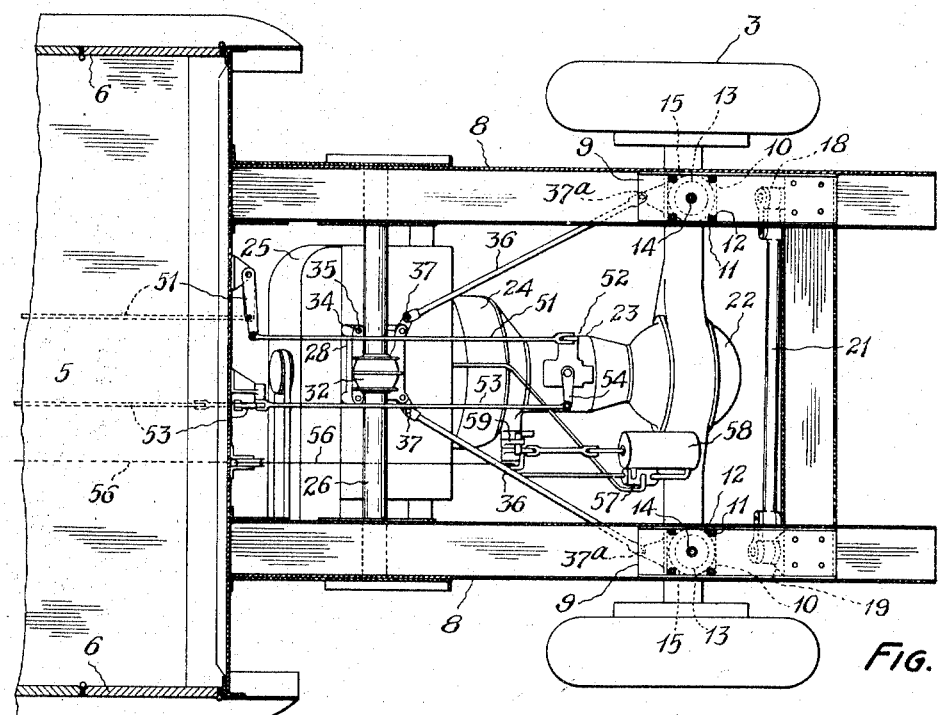
FIG. 4.
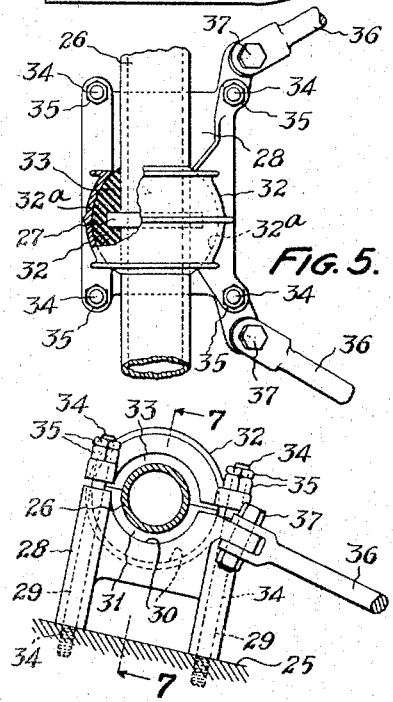
FIG. 5.
FIG. 6.
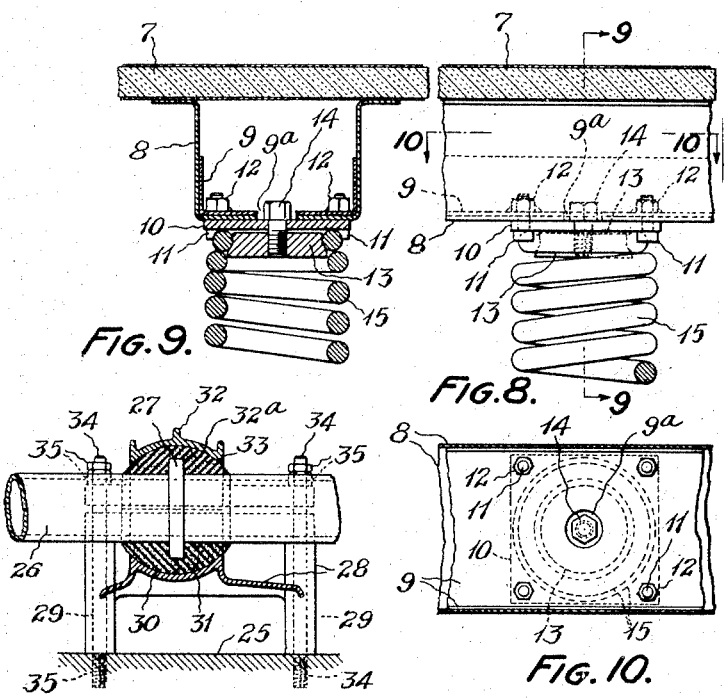
FIG. 9.
FIG. 8.
FIG. 7.
FIG. 10.
INVENTOR:
ORPHEUS F. QUARTULLO
BY
ATTORNEY Patented Dec. 31, 1940

2,227,379

UNITED STATES PATENT OFFICE 2,227,379

ENGINE MOUNTING

Orpheus F. Quartullo, Cleveland Heights, Ohio, assignor to The White Motor Company, Cleveland, Ohio Application March 3, 1939, Serial No. 259,517

3 Claims. (Cl. 180—57)

My invention entitled an "engine mounting" pertains to a three point suspension of a higher power unit assembly comprising an engine, clutch, speed-change transmission and driven axle structure.

My several decades business association with the automotive industry has caused me to become familiar with the evolution of engine mountings and I know that engines have not only been mounted at three points but have had at least at one of the points a universal connection, also, that the incorporation of rubber in various ways has been successfully practised. Moreover, my knowledge comprehends the disclosures of many patents from various sub-classes including 43, 54 and 64 of Class 180.

The general object of my present invention has been to re-adapt certain old principles in combination with several new ideas and I have built a successful full-sized model which after protracted test in an automotive vehicle has proven itself quite satisfactory.

One object has been the realization of a major saving by employment of an unsprung universally movable unitary power-plant assembly comprising, in firm connection, a rear axle structure, a speed-change transmission, a clutch and an air-cooled engine, which saving is consequent in part to elimination of all water line connections, in part to reduction in length of a propeller shaft and in part to elimination of the universal connections at each end of the propeller shaft.

A further object has been the design of a readily detachable power unit assembly so that mere loosening at a few points of suspension, of stabilization and of control mechanism connections will facilitate removal of, and substitution for, what constitutes a replaceable wheeled tractor unit.

Other objects have been to permit limited turning movements of the complete assembly relative to a superstructure by the provision of a single, cushioned universal joint, to provide displaceable body aprons to permit convenient access to the power-plant assembly for adjustments or for its disconnection from the body preparatory to separation of the assembly or substitution for it, to provide connections between certain power-plant units and forwardly located controls which will permit of the various relative movement between the power plant assembly and body, and to provide a generally durable yet simple construction.

Another object has been further to unify the detachable tractor unit by oblique radius rods which firmly connect opposite ends of the driving axle structure with the universal-joint structure which connects the power-plant assembly with the body.

A final object has been the connection of a bumper through a displaceable apron carried by the body whereby, after detachment, the bumper may also be displaced together with the apron to permit access to or complete withdrawal of the power-plant assembly as a tractor unit.

In the drawings:

Fig. 4 is a plan view of the power-plant assembly.

Fig. 5 is an enlarged plan with a small portion broken away and illustrating the front connection of the power-plant assembly.

Fig. 6 is a side elevation of Fig. 5.

Fig. 7 is a partial section on line 7—7 of Fig. 6.

Fig. 8 is an enlarged side view of the connection between the body and the upper end of one of the springs interposed between the body and the rear axle.

Fig. 9 is vertical section on line 9—9 of Fig. 8.

Fig. 10 is a plan section on line 10—10 of Fig. 8.

Figure 1:
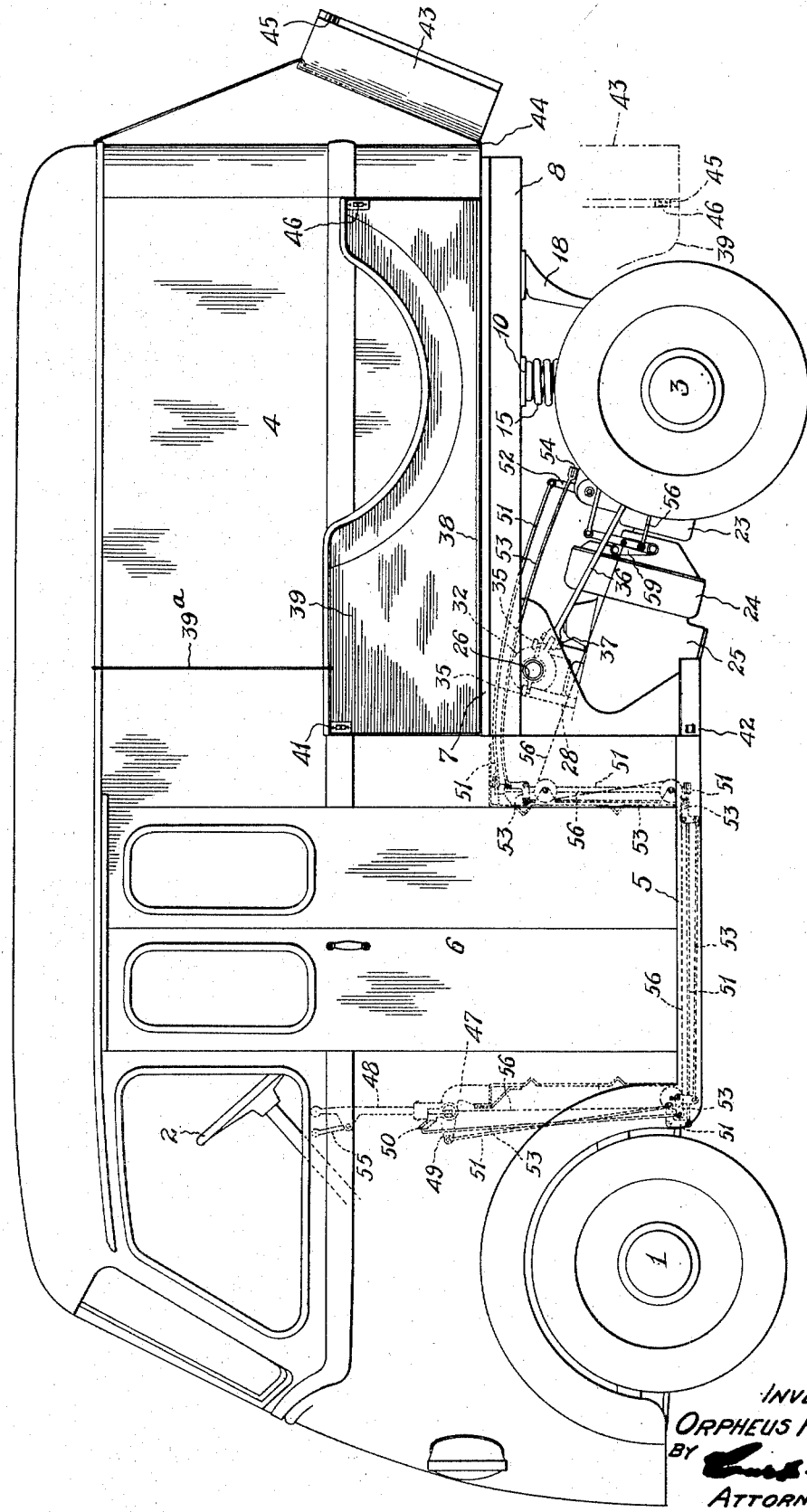
Fig. 1 is a side elevation of an automotive vehicle embodying my inventions and with side and rear aprons raised to expose the power-plant assembly.

Referring to Fig. 1 wherein there is shown a commercial vehicle of the type intended for door to door deliveries, the body 4 is supported at its forward end by a wheeled axle structure 1 and at the rear by a wheeled axle structure 3. The front wheels of the vehicle are steered in the conventional manner through a steering wheel 2. The floor 5 in the central portion of the vehicle is lowered to define a transverse passage which is closed by doors 6, preferably of the folding type. The rear of the body 4 is formed with an elevated portion hereon having a floor 7 for the reception of merchandise.

Figure 2:
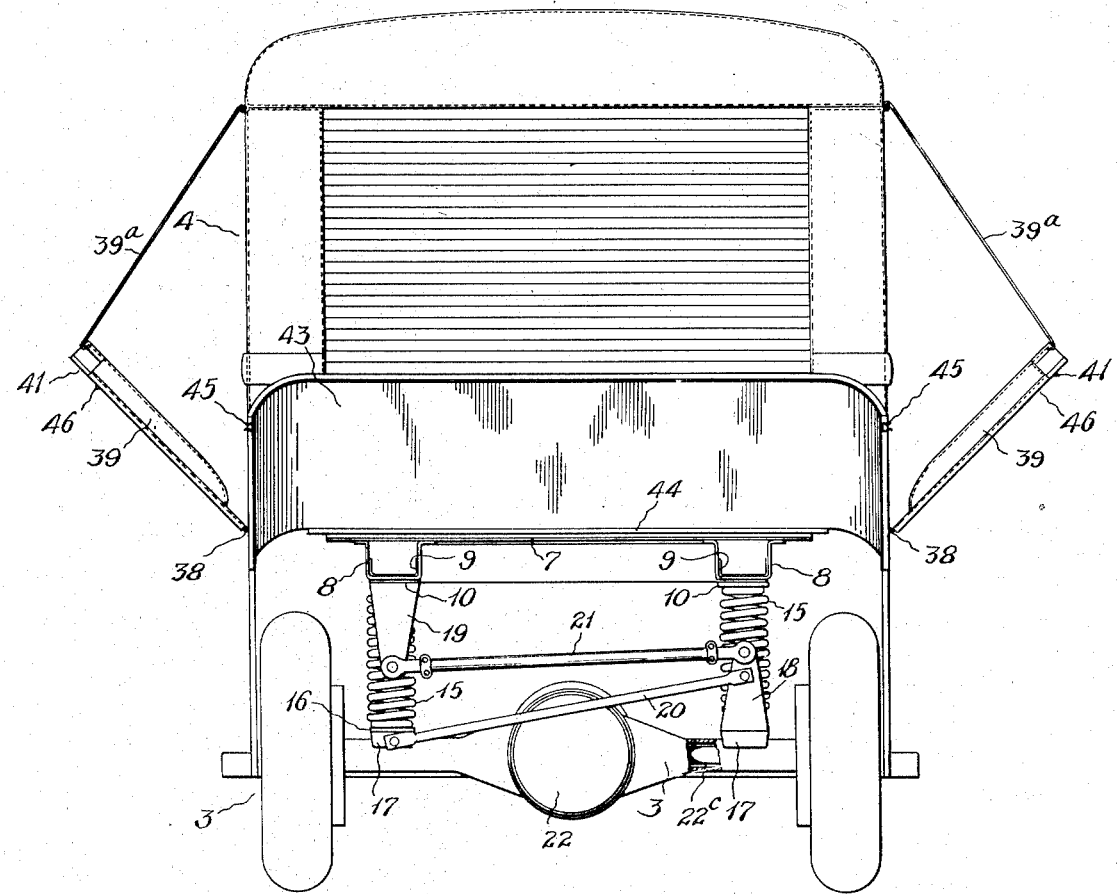
Fig. 2 is a rear elevation of Fig. 1.
Figure 3:
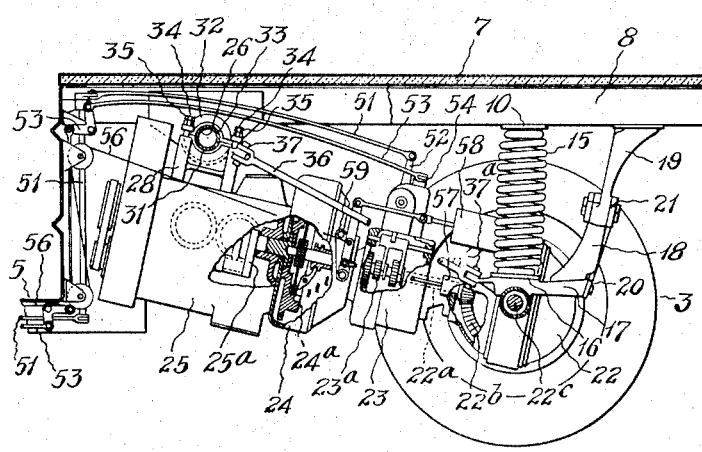
Fig. 3 is a broken detail view with one of the rear wheels removed to reveal the rear spring mounting.
Figure 12:
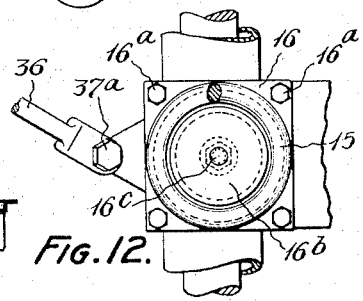
Fig. 12 is a plan section on line 12, 12 of Fig. 11.

Since the parts to be next described are duplicated inwardly adjacent each of the rear wheels only one need be described and the singular number is employed. Channel shaped brackets 8 are secured inwardly of each rear wheel to the underneath portion of the floor 7, as shown in Figs. 2 and 9. Longitudinal channels 9 are welded or otherwise affixed to the interior of the channel bracket 8 to reinforce the lower corners thereof.

Underneath the channel bracket 8 and substantially vertically above the rear axle is a plate 10. Four quadrilaterally spaced cap screws 11 extend upwardly through suitable holes in a plate 10 and the bracket 8 where they are threaded upon nuts 12 welded upon the channels 9. The plug 13 nested in the upper end of a spring 15 is held against the lower side of the plate 10 by means of a cap screw 14, the head of which may pass through a central opening 9a provided in channel 9 and bracket 8. The plug 13 is intended to cooperate with the plate 10 to form a seat for the upper end of the coil spring 15. As will be readily understood, a loosening and withdrawal of the four cap screws 11 will permit separation as a unit of the plate 10, plug 13, screw 14, and spring 15 from the bracket 8.

Figure 11:
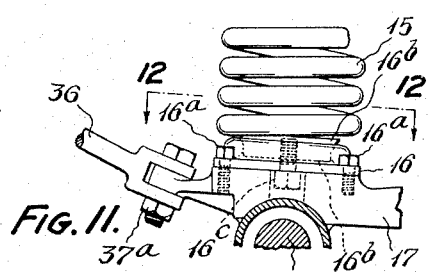
Fig. 11 is an enlarged side view of the connection between the axle and the lower end of one of the springs interposed between the body and the rear axle.

The lower end of the spring 15 is provided with a suitable seat consisting of a plate 16 secured by screws 16a to the upper side of a support 17, which support is fixed on the rear axle structure. A plug 16b is held against the upper side of the plate 16 by means of a cap screw 16c, the head of which projects into a recess formed in the support 17, as shown in Fig. 11. One of the supports 17 is provided with a vertically disposed bracket or ear 18, which serves as a pivotal anchor for one end of a radius rod 21. The end portion of a rod 20 is secured to a support 17, the opposed end thereof being attached to the bracket 18 for effecting the lateral support of the bracket as is shown in Fig. 2. The other end of the radius rod 21 is pivotally connected to the lower end of a bracket 19 depending from one of the longitudinal channels 8 secured to the body 4. The structure just described permits ample relative vertical movement between the body 4 and rear axle structure 3 and yet prevents side sway of the body with relation to the rear axle.

The rear axle structure includes a differential gear housing 22. In firm connection forwardly of the rear axle housing 22 is a change-speed gear transmission box 23, the forward end of which is in firm connection with a clutch housing 24 and the latter similarily in firm connection with an engine case 25 whereby a rigid unitary power-plant assembly is provided. It will be understood that the required rotatable connection is effected from a crank shaft 25a to a clutch 24a, thence through a train of gears 23a to a stub propeller shaft 22a which is connected through differential gearing 22b with the live axle 22c.

About over the front end of the engine and extending crosswise between the floor rails 8 is a tube 26 shown in Figs. 1, 5 and 6. This tube is to constitute the support for a universal joint connection with the front of the engine whereby all expectable movements of the rear axle structure and power-plant assembly relative to the surmounted body may occur. At its middle the tube 26 carries a ring 27 welded thereto.

As shown in Figs. 5, 6 and 7, a bracket 28 having holes 29 therein forms a support for a hemispherical socket 30 within which there is a rubber cushion 31 enclosing one half of the ring 27. A cap 32 formed with a hemispherical socket 32a is mounted upon the socket 30 within which there is a similar rubber cushion 33. The bracket 28 is secured to the top of the engine case by means of studs 34 projecting through the holes 29 in the bracket 28. The cap 32 is detachably mounted upon the socket 32a by means of nuts 35 on the studs 34.

Two radius, brace or tie rods 36 have firm connection at opposite ends, each forwardly at 37 with rear upper corners of the bracket 28 and rearwardly at 37A with the front ends of the supports 17. Thereby the entire power-plant assembly, including the rods 36, moves as a unit relative to the body with all stresses becoming absorbed by the cushions 31 and 33. Hinged on each side of the body at 38 over a rear wheel is an apron 39 comprising a flange-defined, fender-simulating cutout area. And the aprons may be swung up as shown in Figs. 1 and 2 to permit access to the power-plant assembly and be held either in their raised positions by rods 39a hooked into their flanges and into the gutter of the body top or when in their depending positions secured by yielding entrance of a wedge formation on a prong 41 which is carried on their lower front corners into catches 42 that are appropriately located at the lower edges of opposite sides of the body. A rear apron 43 is similarly hinged at 44 and has at each lateral end a catch 45 adapted to receive a prong 46 on the rear edge of each of the lateral aprons whereby the three aprons when in their depending positions are secured to each other to prevent their displacement or rattle.

An improved form of dual control is provided for this drive unit, which is adapted for the simultaneous shifting of the gears and control of the clutch. A hand lever 48 mounted for longitudinal and transverse movement on the body at 47 controls the movement of a pair of lever arms 49 and 50. The arm 49 is connected with a set of levers and links, indicated generally at 51, adapted to translate the longitudinal movement of the hand lever into the longitudinal movement of a vertically disposed lever 52 adapted to shift the transmission gears. The lever arm 50 is adapted to translate the lateral movement of the hand lever 48 through a set of links and levers, indicated generally at 53, into a swinging movement of the gear selecting lever 54 associated with the transmission gears. A hand latch 55 is pivotally mounted adjacent the upper end of the hand lever 48. This hand latch is adapted to actuate a cable control, indicated generally at 56, which actuates a pneumatic valve 57 controlling a cylinder 58 which is adapted to actuate the clutch 24a by means of the clutch lever 59. The above briefly described dual control for transmission gears and clutch is fully disclosed in a copending application, Serial No. 271,765, filed May 4, 1939, now Patent 2,219,601.

An engine throttle control from the front of the vehicle is of course necessarily provided as well as service and emergency brake controls, but, since not herein claimed, such have not been illustrated in detail.

My complete power-plant assembly comprising the engine, clutch, gear box, wheeled rear differential axle structure and radius rods, serves as a quickly removable tractor unit. After the rear and either one of the lateral panels or aprons has been swung up and temporarily so held and a jack support has been placed under the rear of the body, a detachment of the four sets of securing nuts 35 and removal of the universal-joint cap 32 permits the bracket 28 to be separated from the crosswise support 26 and lowered. A removal either of the two sets of four caps screws 11 or of the four cap screws 16a permits the upper or lower seats for the coil springs to be separated from the body channels 8 or rear axle 3, respectively. After disconnection of the plural controls from the engine, clutch and gear-shift transmission the entire power-plant assembly may be rolled rearwardly from the body.

The universal joint permits all of the limited relative movements between the rear axle structure and body, which inevitably tend to occur and for which provision must be made. The rubber cushions serve as torsional restraining elements with beneficial results.

Concluding: Repeated demonstration has shown that complete demountability and withdrawal of the power assembly is accomplished by two men in about ten minutes whereas reconnection may be effected in about fifteen minutes. The side hinges 38 and the rear hinge 44 are so designed that their sockets and hinge pins may be separated by exerting a relative axial displacement which is possible of being effected when their respective aprons 39 and 43 have been brought to a predetermined partially raised position. Thereby a complete detachment of the aprons may be readily made preparatory to protracted mechanical attention applied to the tractor unit. The engine is so shielded as to be free from road splash, the engine accessories remain securely attached because of the three-point vibration absorption (at universal joint bushing and two rear tires), the crankcase oil may be conveniently supplied by raising one side panel, the one-piece rear axle housing is sturdy, the angle of the rear bar for preventing sway on the coil springs is selected so as most successfully to perform its duty and all of the control connections are enclosed where necessary to insure their cleanliness, yet each is quickly separable and a rest rod provided for supporting the tractor-carried rear ends thereof preparatory to and during withdrawal of the tractor.

I claim:

1. In an automotive vehicle embodying a chassis frame and a power unit, which includes an engine, transmission, and drive axle, a mounting structure for said power unit comprising, a chassis frame cross member, an abutment thereon intermediate its ends, a hemispherical socket mounted on said engine, a removable hemispherical cap thereon, a split spherical cushion disposed between said socket and said cap and having grooves therein interengaged with said abutment, helical springs demountably supported intermediate said chassis frame and axle, supporting plates on said axle, radius rods connected with said engine socket and said plates and a transverse radius rod connected to said chassis frame and one of said plates to prevent side sway of the said chassis.

2. In an automotive vehicle embodying a chassis frame and a power unit, which includes an engine, transmission, and drive axle, a mounting structure for said power unit comprising, a chassis frame cross member, an annular ring affixed thereto upon the central portion thereof, a rubber ball mounted on said frame cross member and having a groove therein engaged with said ring, a socket on said engine substantially surrounding said ball, helical springs intermediate said chassis frame and said axle, radius rods connected with said socket and said axle for reinforcing the component parts of said power unit and a sway stabilizer between said axle and said frame to dampen the oscillatory movement between said axle and frame.

3. In an automobile embodying a frame and a power unit comprising an engine, transmission, drive axle and wheels, means for connecting said power unit to said frame comprising, a frame cross member, a rubber sphere mounted thereon, means restraining said sphere from lateral movement on said cross member, a socket constituting a band on said engine engaging said sphere on each side of the equator thereof, helical springs intermediate said axle and said frame and means restraining said socket from movement over the periphery of said sphere whereby the radial and torsional stresses initiated by movement of the springs are cushioned by deformation of said sphere.

ORPHEUS F. QUARTULLO.